June 14, 1960  C. J. LEWANDOWSKI  2,940,239
HAY COMBINE
Filed Dec. 2, 1958  3 Sheets-Sheet 1
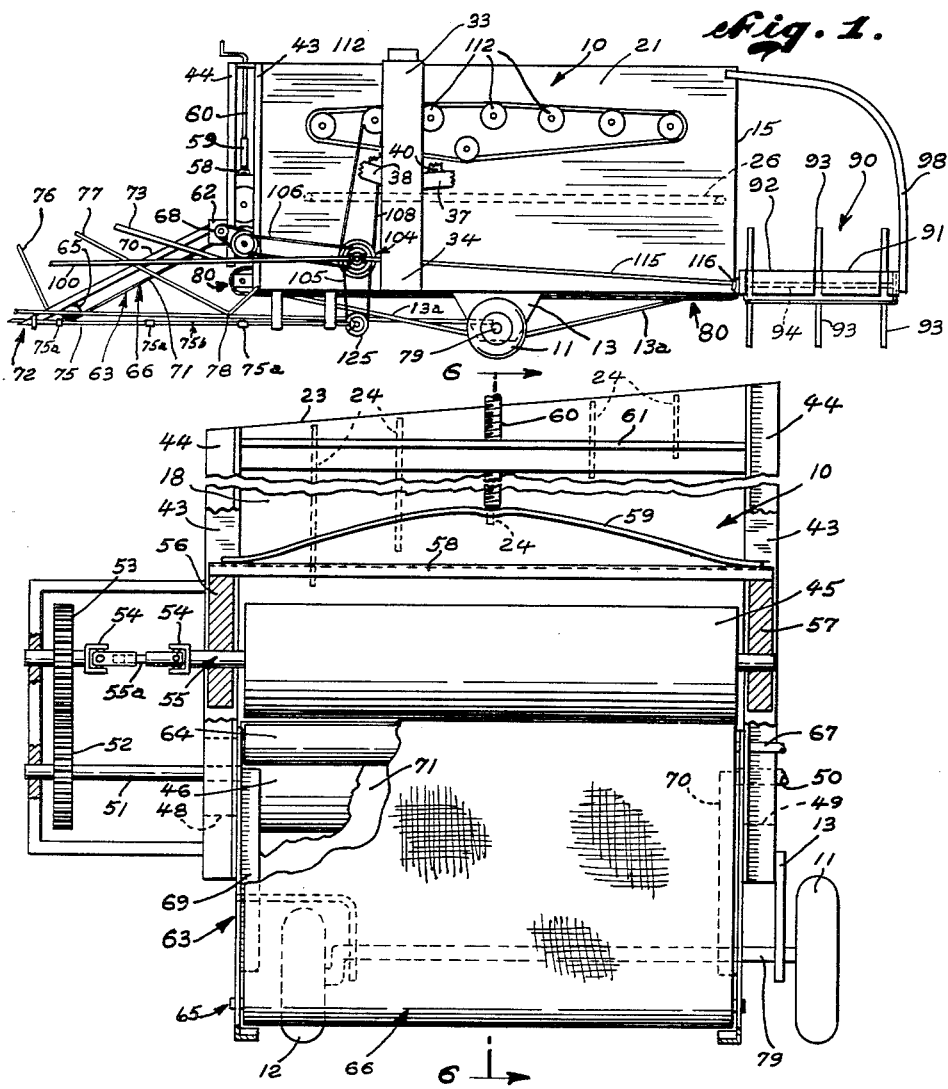
INVENTOR.
CHESTER J. LEWANDOWSKI
BY
Albert Latta
ATTORNEY June 14, 1960     C. J. LEWANDOWSKI     2,940,239
HAY COMBINE
Filed Dec. 2, 1958     3 Sheets-Sheet 2
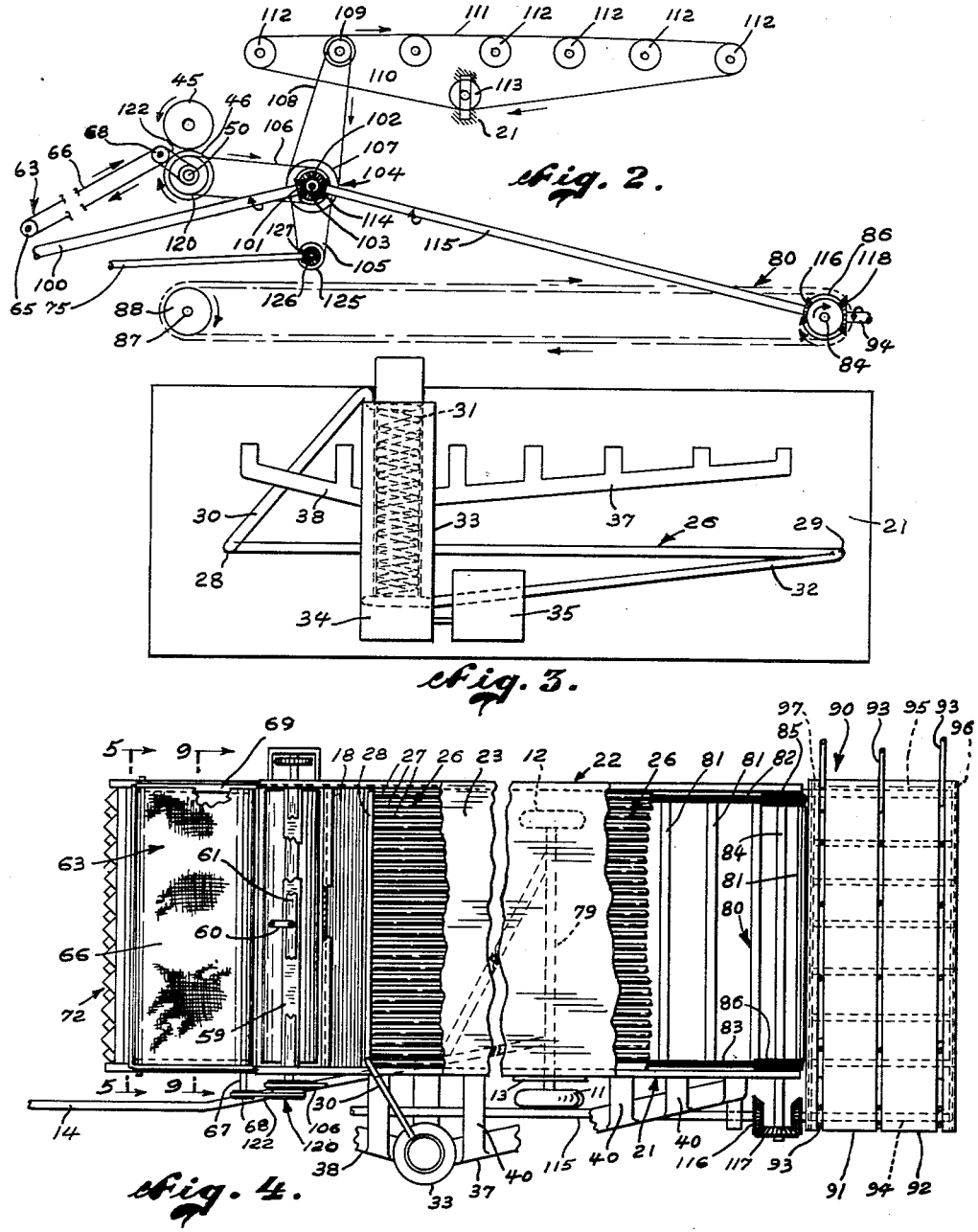
INVENTOR.
CHESTER J. LEWANDOWSKI
BY
ATTORNEY June 14, 1960   C. J. LEWANDOWSKI   2,940,239
HAY COMBINE
Filed Dec. 2, 1958   3 Sheets-Sheet 3

INVENTOR.
CHESTER J. LEWANDOWSKI
BY
Albert Latta
ATTORNEY

2,940,239
HAY COMBINE

Chester J. Lewandowski, Rte. 2, Box 296, Kenosha, Wis.

Filed Dec. 2, 1958, Ser. No. 777,793

5 Claims. (Cl. 56—1)

The invention relates to a machine for harvesting and processing hay and this application is a continuation-in-part of my co-pending application, Serial No. 657,845, filed on May 8, 1957, now abandoned.

The invention has particular reference to the type of machine directed to reducing the time interval between cutting and storage of the standing hay.

The principal object is to provide a machine which, with one pass through a field of standing hay, will cut, process and arrange the hay on the ground so that final drying of the hay can be accomplished within a sufficiently brief time intereval to permit pickup and storage of the hay in a storage building on the same day of the cutting of the hay.

Another object of the invention is to provide a machine which is generally improved over those of the prior art.

A specific object is to provide in a machine of this type an arrangement of the component parts thereof which results in a more efficient machine, a less expensive machine, and a machine of minimum size.

Another specific object is to provide the heating and circulating apparatus in a manner such that the underside of the machine is left entirely open for facilitating moisture removal.

Another specific object is to provide in a machine of this type supporting wheels arranged to avoid running over standing hay.

A further object is to provide an improved arrangement of driving mechanism in a machine of the type described.

Another object is to provide in a machine of the type described means for elevating the forward portion of the machine as desired and adidtional means for elevating the sickle and pick up conveyor as desired.

Another object is to provide an improved crusher roll assembly in a machine of the type described.

Other objects and advantages of the invention will be apparent from the ensuing specification and appended drawings in which:

Fig. 1 is a side elevational view of the machine with certain parts shown fragmentarily and certain other parts being omitted for purposes of clarity.

Fig. 2 is a schematic view of the major portion of the driving mechanism employed with the machine.

Fig. 3 is a schematic view of the heating system employed with the machine.

Fig. 4 is a plan view of the machine with certain parts omitted and with various other parts shown fragmentarily for purposes of clarity.

Fig. 5 is an enlarged front view of the machine with certain parts broken in section and other parts shown fragmentarily—such view being taken generally on the line 5—5 of Fig. 4.

Figure 6:
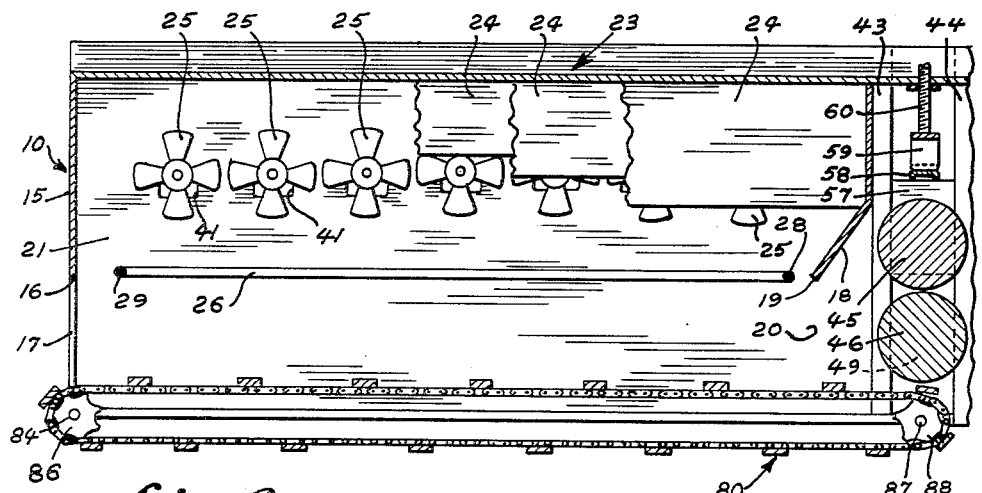
Fig. 6 is a vertical sectional view taken generally on the line 6—6 of Fig. 5 and with certain parts shown fragmentarily—a number of the component parts at the forward end of the machine being omitted.

In general, the combined harvesting and processing machine includes a body portion or enclosure, identified generally by the numeral 10, which includes side walls, front and rear walls, and a roof—there being no floor in the enclosure as will be explained more fully hereinafter. A pair of ground engaging wheels 11 and 12 may be mounted on a suitable axle carried by the supporting plates 13 (only one of which is shown), with suitable braces 13a. A tongue 14 is provided at its forward end with a suitable hitch (not shown) for attachment to the hitch of a tractor or other vehicle (not shown) for pulling the machine.

The enclosure 10 may be fabricated of a suitable frame work, portions of which are shown throughout the drawings, such frame work providing the skeleton to which suitable sheet metal walls are secured. The enclosure may be about 14 ft. in length and about 3 ft. in height (measuring the larger side wall 21).

Viewing Fig. 6, it will be noted that the rear wall 15 of the enclosure terminates at 16 so that an opening 17 is formed at the rear end of the enclosure, such opening extending across the entire width of the rear wall. The forward wall 18 may extend vertically downwardly through a portion of its extent and then be bent inwardly as best shown in Fig. 6. As in the case of the rear wall, the forward wall terminates at 19 providing an entrance opening 20 which extends across the entire width of the front wall.

Each of the side walls 21 and 22 extends throughout the length of the enclosure and throughout the full depth of the enclosure, as best shown in Figs. 1, 4 and 6. The roof panel 23 closes off the entire upper end of the enclosure and may be inclined from one side wall to the other for air circulation purposes as will be described hereinafter.

A series of baffle plates 24 (see Figs. 5 and 6) may be secured to the roof panel, extending throughout the length thereof, and being of progressively increasing depth for assisting in directing the air blasts from the fans 25 downwardly through the heat radiating core 26 in a generally evenly distributed manner throughout the length and width of the enclosure.

The heat radiating core, as best viewed in Fig. 4, extends throughout substantially the entire length of the enclosure and may be fabricated of a series of copper tubes 27 arranged side by side and extending lengthwise of the enclosure, each of said tubes opening at its opposite ends into the primary entrance and discharge tubes 28 and 29 respectively. A suitable conduit 30 may lead from the discharge end of the heating coil 31 into the inlet tube 28 and a suitable return conduit 32 may lead from the discharge tube 29 back to the heating coil 31. The heating coil, is of course, housed in a suitable boiler 33 having burner compartment 34 and a fuel tank 35 associated therewith. The heating agent is preferably water which flows continuously through the heat radiating core 26 during the harvesting operation. A supplementary heating system may be provided by means of suitable heat transfer ducts 37 and 38 which may open into the jacket of the boiler to siphon off the heat radiated by the heating coil 31. The primary ducts 37 and 38 may be provided with tributary ducts 40 each of which opens respectively into an entrance opening 41 situated behind each of the fans, said openings being cut into the side wall 21 as best shown in Fig. 6.

At the forward end of the machine a pair of angle irons 43 and 44 may be arranged in a parallel manner at each side of the enclosure to provide suitable guide rails for accommodating the crusher rolls 45 and 46. The lower roll 46 is supported for rotation by means of suitable bearing blocks 48 and 49 which are anchored to the aforementioned angle irons. Appropriate shafts 50 and 51 may extend from opposite ends of the lower roll, the shaft 50 being driven as will be explained hereinafter, the shaft 51 serving to drive the upper roll 45 through the medium of suitable spur gears 52 and 53 and shaft 55. The shaft 55 may be provided with suitable universal joints 54 and a splined drive connection 55a to permit up and down and rocking movement of the upper roll relative to the lower roll. The upper roll is carried by suitable bearing blocks 56 and 57 which are guided between the respective angle irons at the opposite sides of the enclosure but are free to slide relative to the said angle irons. A cross channel 58 spans the bearing blocks and is secured thereto, and a leaf spring 59 bears against the channel iron at the respective ends thereof. An adjustment screw 60 may be threaded through a suitable transverse angle iron 61 and the tension on said spring may be adjusted by means of said screw.

Figure 7:
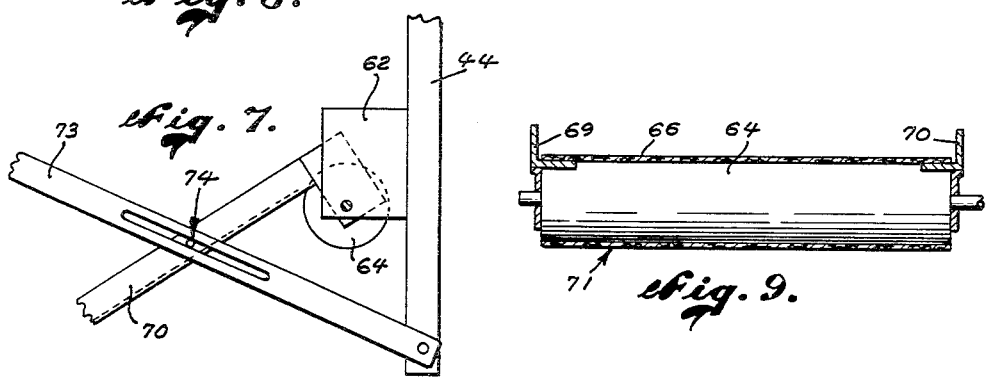
Fig. 7 is an enlarged fragmentary detail view of a portion of one of the elevating devices.
Figure 9:
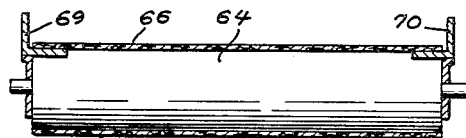
Fig. 9 is an enlarged detail sectional view of the pick up conveyor taken generally on the line 9—9 of Fig. 4.

Secured to each of the forwardmost angle irons 44 on opposite sides of the enclosure are support plates 62 which carry the pick-up conveyor assembly and sickle, identified generally by the numeral 63, which transfers the hay after cutting to the crusher rolls. The conveyor assembly includes upper and lower rolls 64 and 65, respectively, and an endless conveyor belt 66 trained about the rolls. The upper roll has a shaft at one end thereof, identified by the numeral 67, of sufficient length to accommodate the drive pulley 68, the lower roll serving as an idler roll. Viewing Fig. 9 it will be noted that the marginal edges of the canvas belt overhang the angle irons 69 and 70—such angle irons serving as bearing surfaces for the upper run of the belt while the return side 71 of the belt hangs free. The angle irons are pivotally carried by the support plates 62 so that the entire conveyor assembly along with the cutting sickle 72 can be elevated relative to the ground as desired. Such elevation is accomplished by means of a hand lever 73 (shown in detail in Fig. 7), the lower end of which is pivotally carried by one of the angle irons 44. The lever is connected to the angle iron 70 as by means of a slot and pin arrangement 74 whereby raising the lever upwardly causes the conveyor assembly and sickle to be likewise elevated upwardly as desired. The conveyor assembly can be temporarily locked in a selected elevated position by means of a conventional rack and pawl mechanism (not shown) as described hereinafter with reference to Fig. 8.

The sickle 72 is of conventional construction, preferably being of the reciprocating type and driven by means of drive shaft 75, such shaft being provided with suitable universal joints 75a to accommodate the elevating of the conveyor assembly. The shaft is also provided with a suitable spline type joint 75b (of the type shown in Fig. 5, and identified as 55a) to accommodate the bending of the shaft at the universal joints during elevation of the conveyor assembly. The sickle proper may be also raised or lowered (in a conventional manner not shown herein) as desired in accordance with the condition of the terrain as by means of a lever 76.

Figure 8:
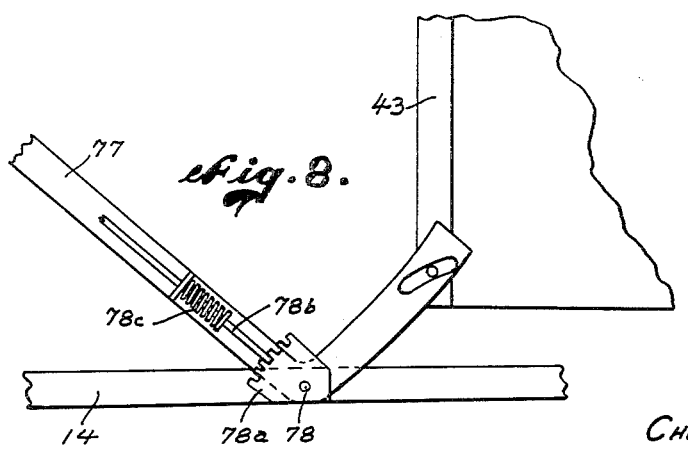
Fig. 8 is an enlarged fragmentary detail view of another of the elevating devices.

The entire enclosure 10 may be tilted about the axis of the ground wheels 11 and 12 by means of a hand operated lever 77 (shown in detail in Fig. 8). The lever may be generally L-shaped and pivotally secured, as at 78, to the hitch tongue 14 whereby when the end of the lever is pushed downwardly the forward end of the enclosure will be lifted upwardly about the axis of the ground wheel axle 79. It will be understood that raising the forward end of the enclosure also effects a raising of the conveyor apparatus 63. In order to temporarily secure the enclosure in a selected position of tilt a rack and pawl assembly may be employed—the rack 78a being secured to tongue 14 and a rod 78b extending along the length of the lever 77 for actuation at the end of the lever. A spring 78c normally urges the end of the rod into one of the notches provided in the rack as desired.

After the cut hay has traveled up conveyor belt 66 and through the crusher rolls, then it enters the enclosure through opening 20 from whence it drops onto an endless conveyor 80 which extends throughout the length of the enclosure likewise spanning the width of said enclosure as best shown in Fig. 4. This conveyor may be fabricated of a series of slats 81 connected at their opposite ends to the endless chains 82 and 83 on opposite sides of the enclosure. A drive shaft 84 spans the enclosure at the rear end thereof, being supported thereby, and suitable drive sprockets 85 and 86 are secured to said drive shaft for driving the conveyor chains. An idler shaft 87 at the forward end of the enclosure is likewise provided with suitable idler sprockets 88 (only one of which is shown) for accommodating the conveyor chains. The hay, of course, passes beneath the heat radiating core 26 throughout the length of the enclosure before being expelled out through the rear wall thereof through opening 17.

As the hay is discharged through opening 17 it is deposited onto a suitable windrow apparatus, identified generally by the numeral 90, from whence it is then deposited at the end 91 thereof onto the ground in a neat row. The windrow apparatus may include the receiving platform 92 which is slotted to permit the tines 93 to travel there-through for carrying the hay to the discharge end of the platform 92. The tines may be secured to an endless conveyor mechanism including the drive and driven shafts 94 and 95 and the chain and sprocket assembly identified generally by the numerals 96 and 97. Suitable braces 98 may be utilized to tie the windrow platform to the rear end of the enclosure 10.

Referring to Fig. 2, I have shown the driving mechanism schematically for purposes of clarity, such driving mechanism including the power take-off shaft 100 which is preferably driven from a suitable power take-off connection on the tractor (not shown) which pulls the entire machine. The power take-off shaft may have a bevel gear 101 at the end thereof which drives bevel gear 102 which is secured to the end of a suitable shaft 103 which extends outwardly from, and is carried by the side wall 21, of the enclosure. A two-step pulley, identified generally as 104, may be mounted to rotate along with gear 102, driving respectively the belts 105 and 106. A sprocket 107 is also carried on shaft 103 and rotates along with gear 102 to drive the chain 108 which drives the sprocket 109 which in turn drives pulley 110. The drive pulley 110 in turn drives one of the fans 25 while driving belt 111 in turn drives all of the remaining fans through their respective pulleys 112. The pulleys are, of course, located externally of the enclosure while the shafts extend through the side wall of the enclosure to carry the fans 25 which are mounted inside of the enclosure. Adjustable pulley 113 may be carried by the enclosure wall for adjusting the tension of the drive belt 111. Gear 102 drives bevel gear 114 which is secured to shaft 115 which drives gear 116. The conveyor drive shaft 84 has a bevel gear 117 secured thereto for driving the conveyor apparatus 80. Gear 117 drives gear 118 which is secured to the end of the windrow drive shaft 94 for driving the conveyor apparatus of the windrow. The lower crusher roll drive shaft 50 may have a two-step pulley 120 driven by belt 106, and belt 122, through pulley 68 drives the upper roll 64 of the conveyor apparatus 63. One sheave of the two-step pulley 104 drives pulley 125 through belt 105 thereby driving bevel gear 126 which drives gear 127 and the sickle actuating shaft 75.

Operation

Assuming that the machine is ready to be used in a field of standing green hay which is ready for harvesting, the hinge tongue 14 being secured to the pulling tractor and power take-off shaft 100 being connected to the power take-off connection on such tractor, the sickle will first be adjusted to the desired position by lever 76 and during the cutting operation such sickle will normally be riding on the ground while cutting the standing hay. The machine is preferably hauled at a speed of about 4 or 5 miles per hour to obtain the overall desired results. As the hay is cut, the upper ends of the stalks drop onto the conveyor belt 66 being directed so as to encounter the crusher rolls ahead of the lower ends of the stalks. The hay will travel up the conveyor belt with the stalks thereof being generally directed length-wise of the belt and after the hay has passed between the crusher rolls, the stalks drop onto the conveyor slats 81 while still being generally directed lengthwise of the enclosure. The length of the stalks is such that the conveyor 80 can be made up of slats 81 which are spaced from each other so that the entire underside of the enclosure is "wide-open" (except for the small amount of area taken up by the slats themselves).

As the hay travels through the crusher rolls, the stalks are, of course, crushed so that the moisture, normally contained internally in said stalks, is exposed so as to be subject to rather rapid evaporation. Thus, as the crushed hay travels along the conveyor 80, it passes directly beneath the heat radiating core 26 and the fans 25, with the assistance of the baffle plates 24, directing a blast of air through the heat radiating core and through the hay and then out through the floor-less enclosure and out the under side thereof. It will be understood that the air entering the enclosure through the openings 41 adjacent the fans is heated thereby expediting and supplementing the heat which is imparted to such moving air by the heat radiating core 26. It will be understood with the under side of the enclosure entirely open and unrestricted, the movement of the air through the hay is facilitated and at the same time the moisture collected by said air is immediately discharged outside of the enclosure and consequently does not need to be entirely evaporated within the enclosure. This permits a machine of minimum length in that the efficiency in removing the moisture from the hay and from the interior of the enclosure is very high due to the air circulation set-up. The hay does not need to be subjected to the hot air blast for an appreciable length of time and consequently the conveyor mechanism 80, as well as the enclosure, may be kept at a minimum length. It will be understood that after the hay is discharged from the enclosure onto the windrow, a large portion of the moisture will have been removed therefrom and that which still remains has been exposed through the crushing operation whereby the final evaporation of such moisture can take place after the hay has been deposited on the ground within a very short interval of time, within a few hours (on a normal day with the sun shining one and one-half to two hours will be sufficient), and the hay can then be collected and stored on the same day of harvesting without having to be left exposed to the elements for several days. The speed of rotation of the endless conveyor mechanism which carries the tines 93 is such that the hay is fluffed up before being deposited on the ground in row form, the fluffed up condition of the hay serving to accelerate the final drying thereof by evaporation into atmosphere. Preferably, the surface speed of such conveyor mechanism is substantially the same as the surface speed of the conveyor 80.

It will be understood that while the crushed hay is passing beneath the heat radiating core, the hot air directed onto the hay accelerates moisture evaporation and when the hay is dropped onto the ground from the windrow, it is still hot and must remain on the ground for one and one-half hours or so to cool—moisture evaporation continuing during this period. The hay is then ready for storage on the same day that it is cut. In one pass of the machine through the field the standing hay is cut, crushed, partially dried by the use of heat and forced air, and then deposited on the ground in row form for final drying preparatory to being picked up for permanent storage.

The temperature of the water which travels through the radiator core 26 is preferably about 175° to 200° F. so that optimum heating by the radiator is obtained while maintaining the water slightly below boiling point, it being understood that the fans 25 draw the hot air from the interior of boiler 33 through the ducts 40 and wall openings 41 into the interior of enclosure 10 to supplement the heat of core 26.

Viewing Fig. 4 it will be noted that the end 91 of the windrow platform 92 projects outwardly a considerable distance beyond the side wall 21 of enclosure 10 so that the row of fluffed up hay on the ground will not be run over by the tractor on the next pass of the machine through the field—consequently the "windrowed" hay remains fluffed up to permit more rapid drying. The position of the tractor (not shown) is such that the full width of the sickle is to one side of the tractor—the tractor travelling in the path cut by the sickle in the preceding pass of the machine.

As has been mentioned before herein, certain components shown in one or more views have been omitted from other views for purposes of clarity. For example, while the fuel tank 35 is shown in Fig. 3, it is omitted from all other views. In Fig. 4 the fans 25 and pulleys 112 are omitted along with the various actuating levers 73, 76 and 77, drive shaft 75, pulley 104, frame members 98, etc. In Fig. 5 all of the components on that side of the machine viewed in Fig. 1 have been omitted, such as the fuel tank, heat ducts, drive mechanism, levers, hauling tongue, sickle, etc. In Fig. 6 the windrow apparatus is omitted as well as the ground wheels, tongue, drive shafts, etc. It will be understood, however, that all of the components important to an understanding of the invention are disclosed in one or more of the views.

I claim:

1. An ambulant machine for partially drying cut and crushed forage comprising a wheel supported enclosure open at its under side and having a forage entrance at one end and a forage discharge at the opposite end, and having an endless slatted conveyor located adjacent the open under side of the enclosure, and having openings between the slats, radiant heating means and means supporting the same above said conveyor, blower means and means supporting the blower means within said enclosure above the heating means, air inlet means extending into the enclosure and communicating with said blower means, means connected with the conveyor to operate the same at a speed to partially dry the forage, forage feeding means leading to the enclosure entrance, and discharge means connected to the discharge end of the enclosure.

2. An ambulant machine as defined in claim 1 wherein the forage feeding means includes forage cutting means, forage crushing means, and initial conveying means conveying the cut hay from the cutting means to the crushing means.

3. Forage drying means as defined in claim 1, wherein the heating means comprises a plurality of heating tubes extending lengthwise of the enclosure.

4. Forage drying means as set forth in claim 3, wherein the blower means comprises a plurality of fans located above the heating tubes.

5. In an ambulant machine as set forth in claim 1, windrowing means arranged to receive the forage which has been treated by said forage drying means and deposit it on the ground at one side of the wheeled enclosure, to permit the sun to complete the drying operation.

References Cited in the file of this patent

UNITED STATES PATENTS

| | | |
|---|---|---|
| 1,946,654 | Welty | Feb. 13, 1934 |
| 1,947,338 | Furbush | Feb. 13, 1934 |
| 1,965,229 | Galson | July 3, 1934 |
| 2,239,486 | Edwards | Apr. 22, 1941 |
| 2,521,999 | Scott | Sept. 12, 1950 |
| 2,592,269 | Getz | Apr. 8, 1952 |
| 2,698,170 | Foley | Dec. 28, 1954 |
| 2,756,554 | Diehl et al. | July 31, 1956 |